United States Patent [19]
Koshijima et al.

[11] Patent Number: 5,591,832
[45] Date of Patent: Jan. 7, 1997

[54] BENZYLATED LIGNOCELLULOSIC SUBSTANCE AND A PRODUCING METHOD THEREOF

[75] Inventors: Tetsuo Koshijima, Osaka; Nobuo Shiraishi, Kyoto; Tadashi Takahashi, Osaka; Toshiharu Hiraoka, Osaka; Masami Ueda, Osaka, all of Japan

[73] Assignee: Japan Chemical Engineering & Machinery Co., Ltd., Japan

[21] Appl. No.: 345,404

[22] Filed: Nov. 21, 1994

[30] Foreign Application Priority Data

Nov. 19, 1993 [JP] Japan .................................. 5-290839
Jun. 24, 1994 [JP] Japan .................................. 6-143260

[51] Int. Cl.$^6$ .............................. C07G 1/00; C08H 5/00
[52] U.S. Cl. ............................ 530/500; 536/56; 536/58; 527/400; 527/403
[58] Field of Search ............................ 530/500; 536/56, 536/58; 527/400, 403

[56] References Cited

U.S. PATENT DOCUMENTS 2,491,499  12/1949  Katzen et al. ............................ 527/400
4,997,488   3/1991  Gould et al. ............................. 530/500

FOREIGN PATENT DOCUMENTS 63-61034   3/1988  Japan .
4-110101   4/1992  Japan .
4-156302   5/1992  Japan .

OTHER PUBLICATIONS

Takase et al. "Studies on composites from wood and propylenes", Kennedy et al. (ed.), *Wood Processing and Utilization*, pp. 243–249 (1989).
Yoshioka et al., "Thermoplasticization of Wood and its Application", *Chemical Modification of Lignocellulosics*, Nov. 7–8, 1992, New Zealand.
Shiraishi et al., "Make cellulosics thermoplastic", Chemtech, pp. 366–373, Jun. 1983.
Watanabe et al., "Binding–site Analysis of the Ether Lankages between . . . ", *Agric. Biol. Chem.*, vol. 53(8):2233–2252, 1989.
Imamura et al., "Ester Linkages Between Lignin and Glucuronic Acid . . . ", *Phytochemistry*, vol. 37(4):1165–1173, Pergamon 1994.
Japanese Patent Laid–Open Publication 57–103804, published 28 Jun. 1982.
Japanese Patent Laid–Open Publication 63–60703, published 16 Mar. 1988.

*Primary Examiner*—Nathan M. Nutter
*Attorney, Agent, or Firm*—Millen, White, Zelano & Branigan, P.C.

[57] ABSTRACT

A benzylated lignocellulosic substance obtained through benzylation, wherein 46 to less than 97% of lignin-carbohydrate complex (LCC) contained in a wood raw material from which the substance is formed remains.

10 Claims, 3 Drawing Sheets

BENZYLATED LIGNOCELLULOSIC SUBSTANCE AND A PRODUCING METHOD THEREOF

BACKGROUND OF THE INVENTION (1) Field of the Invention

The present invention relates to benzylated lignocellulosic substances and a method for producing same, and more particularly to benzylated lignocellulosic substances suitable for use as material to be foamed for the production of foamed molded articles without the addition of a plasticizer and a method for producing such formed articles.

(2) Description of the Prior Art

The recent growth of the petrochemical industry has brought about the production of various kinds of plastics. However, since plastics produced in the petrochemical industry are not biodegraded by microorganisms in nature, vast amounts of accumulated plastic waste cause a serious waste disposal problem.

One of the attempts which have been made to solve this problem provides for the collection of used plastic products and the decomposition decomposed of same in chemical reactor so as to produce recycled products. However, the practical use of such recycling is considered difficult for the following reasons. First, the cost of the collection is higher than the manufacturing cost of plastic products. Another reason is that, since a high temperature and a corrosive environment are generated in burning the plastics, the reactor is subject to severe damage, causing a high maintenance cost for the equipment. Order these circumstances, there has been a pressing need for the development of substances which can replace plastics manufactured in the petrochemical industry. Such substances should be easily moldable and should possess sufficient physical properties (e.g., strength) to withstand practical use, as well as biodegradability.

Wood is a typical, natural, high molecular weight lignocellulosic substance, which contains cellulose, hemicellulose and lignin as main components. Such lignocellulosic substances do not have thermoplasticity in themselves so that it was thought to be virtually impossible to mold high molecular weight lignocellulosic substances into various shapes in the same manner as plastics manufactured in the petrochemical industry.

Nobuo Shiraishi, one of the inventors of the present invention, has found that thermal flowability can be imparted to etherificated or esterificated wood flour by hot pressing and he has introduced, in the past, etherificated wood flour and esterificated wood flour as lignocellulosic substances having plasticity. In general, lignocellulosic substances having plasticity are more brittle than plastics manufactured in the petrochemical industry and inferior to the latter in physical properties such as strength. Of the lignocellulosic substances having plasticity, etherificated lignocellulosic substances have comparatively high softening points and suitable physical properties. Of etherificated lignocellulosic substances, particularly benzylated lignocellulosic substances exhibit high softening points and suitable physical properties. Further, the voluminous spatial configuration of benzyl groups in benzylated lignocellulosic substances provides steric hindrance, reducing the degree of the substitution of hydroxyl groups in, for example, a glucose residue contained in wood. In turn, by virtue of the reduction, which of the degree of substitution, hydroxyl groups remain in the substances, thereby permitting biodegradation to take place in nature.

SUMMARY OF THE INVENTION

Even such benzylated lignocellulosic substances, however, are in general disadvantageously brittle as compared with plastics manufactured in the petrochemical industry and therefore do not possess physical properties which can withstand practical use.

As mentioned earlier, the main components of wood are cellulose, hemicellulose and lignin. Cellulose and hemicellulose are hydrophilic macromolecules, while lignin is a hydrophobic macromolecule. These macromolecules having antipodal characteristics co-exist, forming a matrix called wood. In spite of the co-existence of these antipodal macromolecules and a low specific gravity, wood exhibits excellent physical properties. This is largely attributable to the existence of a lignin-carbohydrate complex (LCC) which acts as a compatibilizer for enhancing the interaction between the aggregation of hydrophilic macromolecules and the aggregation of hydrophobic macromolecules at the interface. The above fact is disclosed in a report presented by one of the inventors, Nobuo Shiraishi [S.Takase, N. Shiraishi and M. Takahama, Studies on Composites from Wood and Polypropylenes, "Wood Processing and Utilization", J. F. Kennedy, G. O. Phillips, P. A. Williams (ed.), Ellis Horwood Ltd., Chichester 243–249(1989); Nobuo Shiraishi, Molding Material by Compounding Wood and Synthetic Polymers, Macromolecular Processing, Vol. 38, No.7 26–32 (1989)].

After extensive research efforts, we have found that there co-exist hydrophilic groups and hydrophobic groups in benzylated lignocellulosic substances wherein the average rate of substitution of hydroxyl groups in, for example, a glucose residue during benzylation falls within the range of, for example, 1.3 to 1.5 and part of the hydroxyl groups remains free of benzyl substitution. From the above fact, we have assumed that lignin-carbohydrate complex (LCC) still has the function of a compatibilizer and plays an important role in maintaining good physical properties.

Based on this assumption, the invention is intended to overcome the foregoing problems; therefore, one of the objects of the invention is to provide a benzylated lignocellulosic substance which can be readily molded and possesses physical properties such as strength, which make the product available for practical application. Another object is to provide a method thereof for producing the benzylated product.

In order to accomplish the foregoing object, there is provided a benzylated lignocellulosic substance according to the invention, which then remains is obtained by benzylation and in which 46 to less than 97% of lignin-carbohydrate complex (LCC) originally contained in a wood raw material.

As the wood raw material for producing the benzylated lignocellulosic substance, one kind or a plurality of kinds of hardwoods and/or one kind or a plurality of kinds of softwoods may be used. Since softwoods contain too much lignin and little lignin-carbohydrate complex (LCC), foaming is likely to be impeded. Therefore, when using softwoods, it is preferable to mix the softwoods with pulp and/or hardwoods etc.

Benzylated lignocellulosic substances were prepared, in which there were different percetages of lignin-carbohydrate complex (LCC) remaining in the wood raw material, and Young's modulus of each substance was obtained through a tensile strength test which was conducted under the following conditions.

(1) Molding of Test Sheets

While samples of benzylated lignocellulosic substances were heated at 200° C. with an electric heating press, the pressing pressure was raised from 0 kgf/cm² to 50 kgf/cm² over 3 minutes. Then, the pressing pressure was further raised to 150 kgf/cm² at a temperature of 200° C. and the samples were kept at this temperature for 0.5 minute. The samples were cooled to room temperature by a cooling press under a pressing pressure of 150 kgf/cm², kept at room temperature for 5 minutes, and taken out of the cooling press, whereby test sheets having a thickness of 0.4 mm were obtained.

(2) Stamping-Out of Specimens

After the test sheets thus obtained had been heated at about 100° C. for 15 minutes, 10 mm width×100 mm length strip specimens were stamped out using stamping dies.

(3) Measurement

After the stamped-out specimens had been kept at a temperature of 23±1° C. and a relative humidity of 50±5% for 48 hours or more, thereby adjusting the condition of each specimen to conform to JIS K-7113, the tensile strength of each specimen was measured. The measurements were carried out five times on one specimen, in a room whose temperature and humidity are the same as above.

Tensile strength tests were conducted with an autograph produced by Shimazu Seisakusho, having a capacity of 500 kg-cm, under such conditions that the distance between the grippers is 40 mm and the test speed is 5 mm/min. Elongation was measured by measuring the travel distance of the cross heads, and ultimate tensile strain was obtained by dividing the travel distance of the cross head by the distance (=40 mm) between the handles of the grippers. For each specimen, such a measurement was carried out 5 times and Young's modulus was obtained from the average of the results.

Figure 1:
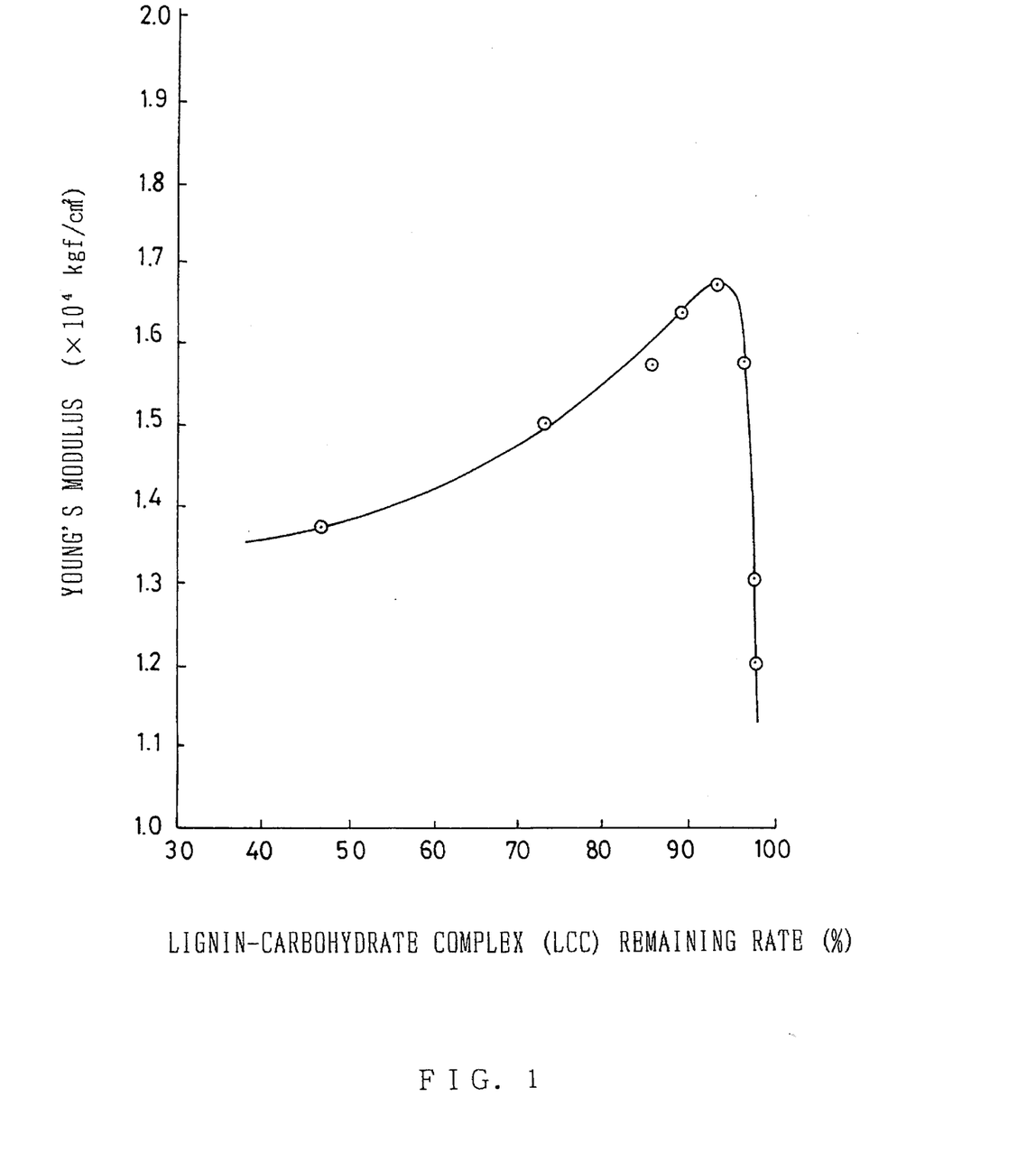
FIG. 1 is a graph showing the relationship between the lignin-carbohydrate complex (LCC) remaining rate (%) of a mercerized hardwood and Young's modulus of the benzylated lignocellulosic substance.

FIG. 1 shows the Young's moduli of test sheets plotted against the lignin-carbohydrate complex (LCC) contained in the wood raw material remaining at different rates (%). The lignin-carbohydrate complex (LCC) remaining rate $z$ (%) is expressed in percentage and obtained by dividing the lignin-carbohydrate complex (LCC) content $y$ (wt %) in each mercerization stage, i.e. at different processing times (this content in mercerization is measured by the method to be described later), by the lignin-carbohydrate complex (LCC) content of a wood raw material used. For example, the lignin-carbohydrate complex (LCC) content of hardwoods is 5.40 percent by weight. In other words, in the case of hardwoods, $z(\%)=(y/5.40)\times100$.

Benzylated lignocellulosic substances, which have a Young's modulus of $1.37\times10^4$ kgf/cm² or more, or a lignin-carbohydrate complex (LCC) remaining rate within the range of 46 to less than 97% (see FIG. 1), were used as material to be foamed and subjected to foaming without using additives. As a result, homogeneous foamed bodies having an expansion ratio of 8:1 or more, in which cells uniform in size were evenly formed after foaming, were obtained. When benzylated lignocellulosic substances, which have a Young's modulus of $1.50\times10^4$ kgf/cm² or more, or a lignin-carbohydrate complex (LCC) remaining rate within the range of 73 to 96%, were subjected to foaming as material to be foamed without using additives, homogeneous foamed bodies having an expansion ratio of 10:1 or more, in which cells uniform in size were evenly formed after foaming, were obtained. When benzylated lignocellulosic substances having a Young's modulus of less than $1.37\times10^4$ kgf/cm², or lignin-carbohydrate complex (LCC) remaining rates other than 46 to less than 97% were used as a material to be foamed without additives, no homogeneous foamed body having an expansion ratio of 8:1 or more was obtained or foaming did not take place at all.

In conclusion, benzylated lignocellulosic substances, in which lignin-carbohydrate complex (LCC) contained in a wood raw material exists in sufficient quantity, have the following Young's moduli. When the lignin-carbohydrate complex (LCC) remaining rate of a benzylated lignocellulosic substance is 46 to less than 97%, the Young's modulus of the substance ranges from $1.37\times10^4$ to $1.70\times10^4$ kgf/cm². When the lignin-carbohydrate complex (LCC) remaining rate is 73 to 96%, the Young's modulus ranges from $1.50\times10^4$ to $1.70\times10^4$ kgf/cm². Such benzylated lignocellulosic substances can be foamed without adding any additives. However, all the benzylated lignocellulosic substances having Young's moduli within the above range do not always achieve good foaming. For example, benzylated lignocellulosic substances made from softwoods or groundwood pulp have a Young's modulus of $1.56\times10^4$ to $1.66\times10^4$ kgf/cm², but do not exhibit good foamability since such wood raw materials contain little lignin-carbohydrate complex (LCC) by themselves.

The lignin-carbohydrate complex (LCC) content (wt %) of a wood raw material before mercerization and after mercerization can be measured by the following procedures.

1. Preparation of a reference lignin-carbohydrate complex (LCC)

Reflux heating of 50 grams of a finely milled wood flour (diameter: 10 to 50 microns) was carried out with 1,000 ml of a 80% dioxane solution for 4 hours. Then, the product was filtered, and the residue of the wood flour collected by filtration was washed with 150 ml of a 80% dioxane solution. The wash liquors were mixed with the filtrate and the mixture was concentrated under reduced pressure to 100 ml at 40° C. At that time, lignin (1.56 wt %) was precipitated.

The concentrate, after removing the lignin precipitate was poured into a separating funnel and then 200 ml of water was added. One hundred ml of chloroform was further added and lignin still remaining in the liquid was extracted by shaking. After allowing the liquid to be stationary for a while, a layer of chloroform was removed. This chloroform layer was washed with water, concentrated, dried and solidified under reduced pressure. The yield of lignin was 2.75%. A layer of water was mixed with the aqueous washings of the layer of chloroform and the mixture was concentrated to 50 ml under reduced pressure. The concentrate thus obtained was poured into 500 ml of ethanol and lignin-carbohydrate complex (LCC) was precipitated. The lignin-carbohydrate complex (LCC) was separated by filtration to collect a cake. The cake of lignin-carbohydrate complex (LCC) was dried under vacuum at room temperature, thereby obtaining the lignin-carbohydrate complex (LCC). The yield of the lignin-carbohydrate complex (LCC) was 2.72%. [J. Azuma, N. Takahashi and T. Koshijima, Isolation and Characterization of Lignin-Carbohydrate Complexes from the Milled Wood Lignin of *Pinus densiflora* SIEB. et ZUCC., Carbohydrate Research, 93, 91–104. (1981)]. The lignin-carbohydrate complex (LCC) thus obtained was standardized as a reference lignin-carbohydrate complex (LCC) and solutions of this reference complex with different concentrations were prepared. The amount of 280-nm ultraviolet (UV) absorbed by each solution (i.e., absorbency) was plotted against the lignin-carbohydrate complex (LCC) concentrations, thereby preparing a working curve which represents Table 1. Utilizing this working curve, the lignin-carbohydrate complex (LCC) content can be obtained. Note that water was used as the solvent for the reference lignin-carbohydrate complex (LCC):

TABLE 1

| No. | Concentration (g/l) | Absorbency |
|---|---|---|
| 1 | 0.0192 | 0.156 |
| 2 | 0.0384 | 0.336 |
| 3 | 0.0576 | 0.504 |
| 4 | 0.0768 | 0.658 |
| 5 | 0.0960 | 0.819 |

2. Extraction of Lignin-Carbohydrate Complex (LCC) Fractions

One hundred ml of a 80% dioxane solution was added to 10 grams of a finely milled unmercerized or mercerized wood flour (diameter: 10 to 50 microns) produced from a wood raw material and the mixture was stirred at intervals overnight (16 to 17 hours), thereby extracting lignin-carbohydrate complex (LCC) at room temperature (18 to 20° C.). After the extraction, the mixture was filtered to separate the residue of the wood flour from the solution. The residue of the wood flour was washed and the washings were mixed with the filtrate and this mixture was evaporated to dryness under reduced pressure, thereby providing a dioxane-extracted fraction. The water-soluble portions of the fraction extracted by dioxane were taken out and their ultraviolet (UV) absorbency was measured. With this absorbency, the lignin-carbohydrate complex (LCC) concentration was obtained from the working curve of Table 1. From this lignin-carbohydrate complex (LCC) concentration, the lignin-carbohydrate complex (LCC) content (wt %) of the dioxane-extracted fraction was determined.

After dioxane extraction and the residual dioxane existing in the residue of the wood flour had been removed by washing with water, the lignin-carbohydrate complex (LCC) was extracted with 200 ml of hot water (90° to 100° C.) for 5 hours. The extract was cooled, filtered, and washed with 30 ml of water. The washings were mixed with the filtrate and the mixture was concentrated to 30 ml under reduced pressure at 40° C. The mixture of the concentrated filtrate and washings was poured into 300 ml of ethanol to produce a precipitate. After separating the precipitate by filtration, the cake of the precipitate was washed with methanol and ether and then dried under reduced pressure at room temperature, thereby providing a hot water-extracted fraction. Although it is reported that the hot water-extracted fraction is rich in lignin-carbohydrate complex (LCC) [Takashi Watanabe, Junichi Azuma, Tetsuo Koshijima, "A Convenient Method for Preparing Lignin-Carbohydrate Complex from *Pinus densiflora* Wood" Mokuzai Gakkaishi Vol. 33, No.10 798–803, (1987)], the following measurement was carried out in order to make certain. Water-soluble portions were taken out of the hot water-extracted fraction and its ultraviolet (UV) absorbency was measured. With this absorbency, the lignin-carbohydrate complex (LCC) content was obtained in the same way as described earlier from the working curve of Table 1. Then, the lignin-carbohydrate complex (LCC) content (wt %) of the hot water-extracted fraction was obtained.

Water was removed from the residue of the wood flour from which the hot water-extracted fraction had been extracted, and then the residue was put in an incubator together with 200 ml of dimethyl sulfoxide (DMSO) and shaken at 30° C. overnight. Thereafter, the residue was separated from the solution by filtration and washed. The filtrate thus obtained was mixed with the washings obtained through washing of the separated residue of the wood flour. After adding a further 200 ml of water, the mixture was dialyzed for two days by the use of a gel cellophane tube. The product was concentrated to 30 to 50 ml under reduced pressure and poured into 500 ml of ethanol to produce a precipitate. The precipitate was separated by filtration and washed with methanol and then with ether. Thereafter, the precipitate was dried under reduced pressure at room temperature, thereby providing a DMSO-extracted fraction. Water-soluble portions were taken out of the DMSO-extracted fraction. With the ultraviolet (UV) absorbency of this water-soluble portions, the lignin-carbohydrate complex (LCC) content was measured in the same way as described earlier, and then, the lignin-carbohydrate complex (LCC) content (wt %) of the DMSO-extracted fraction was obtained [T. Koshijima, T. Taniguchi and R. Tanaka, Lignin Carbohydrate Complex Pt.I, Holzforschung, Band (volume) 26, Heft (number) 6, 211–217 (1972)].

Table 2 shows the respective lignin-carbohydrate complex (LCC) contents (wt %) of the dioxane-extracted fraction, the hot water-extracted fraction and the DMSO-extracted fraction. In Table 2, the total of the contents of these three fractions is represented as the lignin-carbohydrate complex (LCC) content (wt %) of the sample tested. It is clear that the lignin-carbohydrate complex (LCC) contents (wt %) shown in Table 2 are based on mercerized or non-mercerized finely milled wood flours of the wood raw material. The absolute amount (wt %) of lignin-carbohydrate complex (LCC), that is, the amount of lignin-carbohydrate complex (LCC) contained in a benzylated lignocellulosic substance obtained after benzylation can be calculated from the lignin-carbohydrate complex (LCC) content (wt %) of the wood flour in consideration of the increase in the molecular weight caused by benzylation or by mercerization and benzylation.

Note that the mercerized wood flours were prepared by mercerization carried out by the following procedures: 16.6 parts (wherein "parts" means parts by volume hereinafter unless otherwise defined) of a 40% sodium hydroxide solution were added to one part of each wood flour and the mixture in each case was allowed to stand at 23° C. for a specified time respectively after thorough stirring.

TABLE 2

| Samples | Dioxane-extracted fraction LCC wt % | Hot water-extracted fraction LCC wt % | DMSO-extracted fraction LCC wt % | Total lignin-carbohydrate complex (LCC) content wt % |
|---|---|---|---|---|
| Wood raw flour | 2.86 | 2.08 | 0.46 | 5.40 |
| Mercerized wood flour (15 min.)* | 1.61 | 3.55 | 0.06 | 5.22 |
| Mercerized wood flour (17 min.) | 1.62 | 3.57 | 0.07 | 5.26 |
| Mercerized wood flour (20 min.) | 1.58 | 3.55 | 0.05 | 5.18 |
| Mercerized wood flour (25 min.) | 1.57 | 3.45 | 0.04 | 5.06 |
| Mercerized wood flour (30 min.) | 1.57 | 3.23 | 0.03 | 4.83 |

TABLE 2-continued

| Samples | Dioxane-extracted fraction LCC wt % | Hot water-extracted fraction LCC wt % | DMSO-extracted fraction LCC wt % | Total lignin-carbohydrate complex (LCC) content wt % |
|---|---|---|---|---|
| Mercerized wood flour (40 min.) | 1.57 | 3.02 | 0.04 | 4.63 |
| Mercerized wood flour (50 min.) | 1.37 | 2.52 | 0.04 | 3.93 |
| Mercerized wood flour (60 min.) | 0.91 | 1.56 | 0.03 | 2.50 |

*processing time

The extraction rate (the ratio of extracts to a benzylated lignocellulosic substance) was measured by the following procedures when extracts were obtained by heating a benzylated lignocellulosic substance with dioxane.

Reflux heating of 5 grams of a benzylated lignocellulosic substance was carried out with 100 ml of a 90% dioxane solution for 4 hours and then, the product was allowed to cool at room temperature. After adding 100 ml of methanol, the product was filtered and its filtrate was concentrated to about 50 ml. The concentrated filtrate was then poured into a five fold volume of ether, thereby producing a precipitate. The precipitate was separated by filtration to collect a cake, and the cake was washed, dried under reduced pressure and, then, weighed. Thereafter, the ratio of the weight (x grams) of the cake to the weight (5 grams)of the benzylated lignocellulosic substance was obtained (i.e., the ratio=x/5), thereby determining the extraction rate (wt %) (=x/5×100) when the benzylated lignocellulosic substance is heated with dioxane. The extraction rate (wt %) by heating with dioxane is plotted against each processing time for mercerization in the graph of FIG. 2.

It is assumed that the quantity of the lignin-carbohydrate complex (LCC) remaining in a benzylated lignocellulosic substance obtained by benzylation under various conditions does not vary virtually during benzylation but varies during the stage of mercerization which is carried out prior to benzylation. Therefore, in the above measurement, the lignin-carbohydrate complex (LCC) content (wt %) of each benzylated lignocellulosic substance was measured with the above-described procedures upon completion of its mercerization stage. The measured values are plotted against each processing time for mercerization in the graph of FIG. 3.

Test sheets similar to those prepared for the above measurement of Young's modulus were prepared from (i) a benzylated lignocellulosic substance in which 89% of the lignin-carbohydrate complex (LCC) contained in a wood raw material remains; (ii) a benzylated sulfite pulp which does not contain lignin and which is formed by applying the sulfite process to the same wood raw material as that of (i); and (iii) benzylated cellulose made from powdered cellulose. A tensile strength test was conducted in the same way as described earlier to compare the physical properties of these test sheets. The result is shown in Table 3. The melting viscosity of each test sheet was measured in the melting viscosity test to be described later.

TABLE 3

| Samples | Tensile strength (kgf/cm$^2$) | Ultimate tensile strain (%) | Young's modulus (10$^4$ kgf/cm$^2$) | Melting viscosity (poise) |
|---|---|---|---|---|
| Benzylated lignocellulosic substance (lignin-carbohydrate complex [LCC] remaining rate 89%) | 446.0 | 1.82 | 1.63 | 29170 |
| Benzylated sulfite pulp containing no lignin | 425.3 | 12.2 | 1.03 | 6079 |
| Benzylated cellulose | 336.4 | 35.1 | 0.90 | 1136 |

It is obvious from Table 3 that a substance containing lignin has a higher tensile strength and lower ultimate tensile strain than a substance containing no lignin, even if they are formed from the same wood raw material. That is, the Young's modulus and melting viscosity of a substance containing lignin are higher than those of a substance containing no lignin. This tendency is noticeable in benzylated cellulose made from cellulose alone. It is to be understood from the result that lignin contained in a wood raw material increases hardness.

In order to benzylate wood raw materials, mercerization with an alkali having a high concentration is inevitable as a pretreatment. By mercerization, an alcoholic hydroxyl group in cellulose, hemicellulose and lignin which constitute a wood raw material becomes sodium alkoxide and, at the same time, a phenolic hydroxyl group which is contained in lignin in small amounts becomes sodium phenoxide. When sodium alkoxide and sodium phenoxide undergo benzylation with a benzylater such as benzyl chloride, sodium is substituted by a benzyl group so that benzylation takes place. As has been described, benzylation proceeds with only alkali media, so that the presence of alkali prior to benzylation is indispensable.

A polysaccharide component constituting a lignin-carbohydrate complex (LCC) is mainly glucuronoxylan in the case of hardwoods for example, and this glucuronoxylan combines with lignin by benzyl-ester linkages and benzyl-ether linkages [T. Koshijima, T. Watanabe and J. Azuma, Existence of Benzylated Carbohydrate Moiety in Lignin-Carbohydrate Complex from Pine Wood, Chemistry Letters, 1737–1740(1984); T. Watanabe, S. Kaizu and T. Koshijima, Binding Sites of Carbohydrate Moieties toward Lignin in "Lignin-Carbohydrate Complex" from *Pinus densiflora* Wood, Chemistry Letters, 1871–1874, (1986); N. Takahashi and T. Koshijima, Ester Linkages between Lignin and Glucuronoxylan in a Lignin-Carbohydrate Complex from Beech (*Fagus crenata*) Wood, Wood Sci. Technol. 22:231–241, (1988); T. Watanabe and T. Koshijima, Evidence for Ester Linkages between Lignin and Glucuronic Acid in Lignin-Carbohydrate Complex by DDQ-Oxidation, Agric. Biol. Chem., 52(11), 2953–2955, (1988); T. Koshijima, T. Watanabe and F. Yaku, Structure and Properties of the Lignin-Carbohydrate Complex Polymer as an Amphipathic Substance, ACS Symposium Series No.397, "Lignin: Properties and Materials", 11–28, (1989); T. Watanabe, T. Imamura, T. Koshijima and M.Kuwahara, Determination of Ester Bonds between Lignin and Glucuronoxylan in *Fagus*

Figure 3:
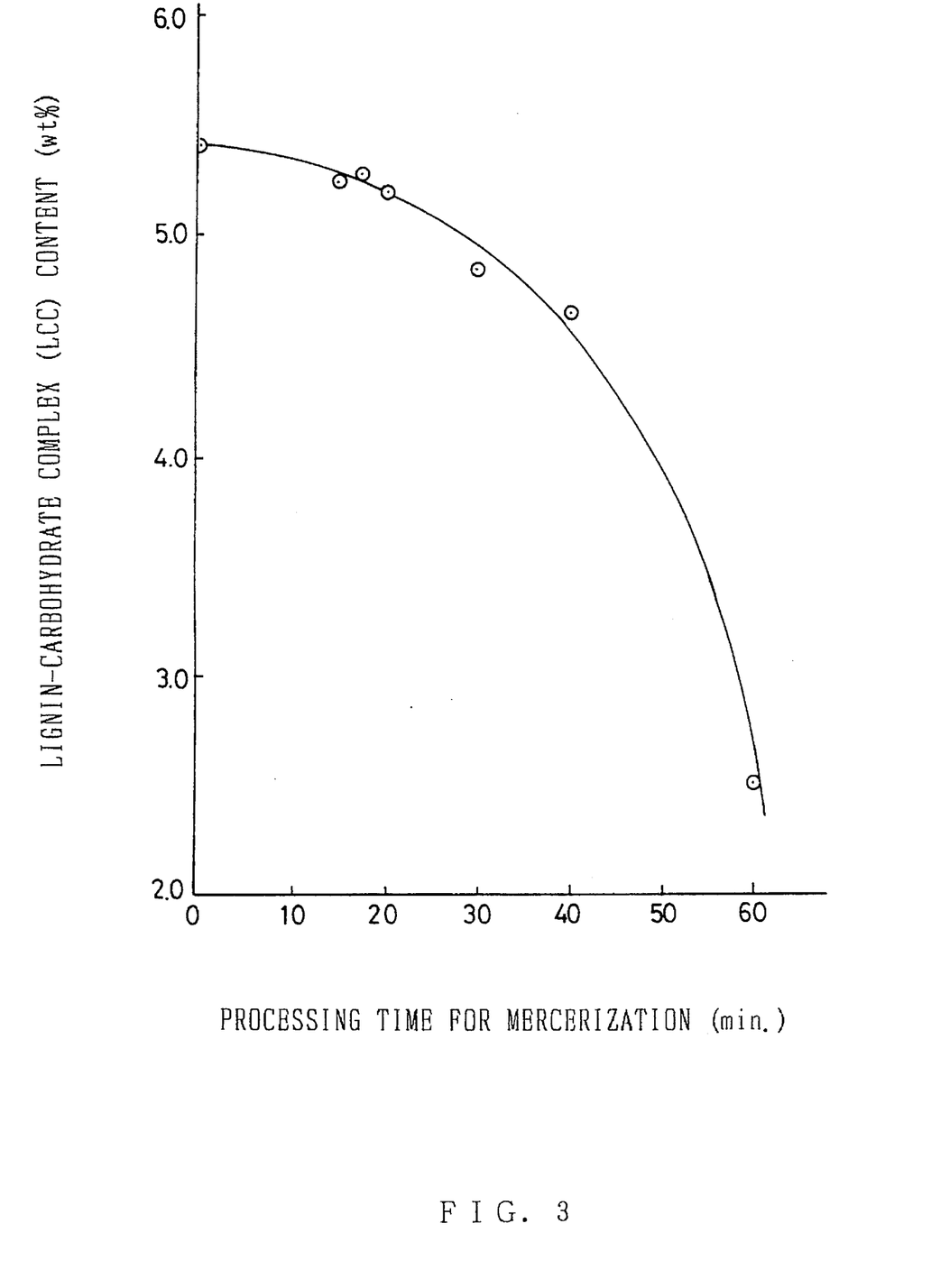
FIG. 3 is a graph showing the relationship between processing time for mercerization of hardwood flour and its lignin-carbohydrate complex (LCC) content (wt %).

*crenata* Wood, Seventh International Symposium on Wood and Pulping Chemistry (Proceedings) 1, 82–86, (1993)] The common feature of a benzyl-ester linkage and benzyl-ether linkage is that they are easily severed and decomposed by alkali, and especially the benzyl-ester linkage which is contained in hardwoods in high proportions is likely to be severed by alkali so that when hardwoods undergo mercerization using high-density alkali, parts of the benzyl-ester linkages are broken. The relationship between the lignin-carbohydrate complex (LCC) content (wt %) of a lignocellulosic substance which has been mercerized and processing time for mercerization is shown in the graph of FIG. 3.

As an example, the melting viscosity of the final product, i.e., benzylated wood flour (benzylated lignocellulosic substance) was measured, when an admixture formed from a plurality of kinds of hardwoods was used as the wood raw material and 50 grams (one part) of the wood flour of this hardwood admixture (100 mesh) was mercerized at 23° C., using 40% sodium hydroxide (16.6 parts), with processing time being varied. The measurement was carried out by the use of a flow tester (produced by Shimazu Seisakusho: CFT-500A) under the following conditions: load=50 kgf; die size=1 mm (diameter)×2 mm (length); 200° C. It is understood from the results as shown in Table 4 that the melting viscosity increases as processing time for mercerization increases. The hardwood admixture employed herein is an admixture of Japanese hardwoods which approximate composition contains 10 wt % of *Acer mono*, 15 wt % of *Cinnamomum camphora*, 25 wt % of *Quercus myrsinaefolia*, 15 wt % of *Firmiana platanifolia*, 25 wt % of *Fagus crenata* and 10 wt % of *Quercus mongolica var. grosseserrata*.

TABLE 4

| Processing time for mercerization (min.) | Melting viscosity (poise) |
|---|---|
| 15 | 2513 |
| 20 | 5297 |
| 40 | 13040 |
| 60 | 15790 |

Similarly, the same flow tester (produced by Shimazu Seisakusho: CFT-500A) was used and the softening point of the same product was measured by a constant rising temperature test under the a temperature range of 50° to 250° C.; constant rate of temperature increase (constant rising temperature)=5° C./min.; load=30 kgf and die size=1 mm (diameter)×2 mm (length). As shown in Table 5, the softening point rises as processing time for mercerization increases.

TABLE 5

| Processing time for mercerization (min.) | Softening point (°C.) |
|---|---|
| 15 | 98 |
| 20 | 105 |
| 40 | 105 |
| 60 | 110 |

In a case where 60 grams (one part) of the wood flour (100 mesh) of the above hardwood admixture are mercerized at 23° C. with 40% sodium hydroxide (16.6 parts, i.e., 1424 grams), optimum processing time for achieving a final product (i.e., benzylated lignocellulosic substance), which is free from brittleness and possesses enough toughness to be used as material to be foamed, is in the range of 20 to 50 minutes. When such a benzylated lignocellulosic substance which had been mercerized for the optimum processing time was subjected to foaming without additives, a foamed material having a closed cell ratio of 100% and expansion ratio of around 20:1 was obtained.

When processing time for mercerization is shorter than 20 minutes, the substitution ratio of benzyl groups decreases by around 10% so that the final product (benzylated lignocellulosic substance) does not improve in its toughness, staying comparatively brittle. On the other hand, when processing time for mercerization exceeds 50 minutes, the brittleness of the final product increases so that it becomes difficult to achieve foaming without additives with a maximum expansion ratio of 10:1 or more. It is to be understood that optimum toughness for foaming can be achieved in the region where processing time for mercerization is 20 to 50 minutes and Young's modulus is $1.50 \times 10^4$ kgf/cm$^2$ or more.

The toughness (or brittleness) of benzylated lignocellulosic substances will be explained as follows, in conjunction with the results shown in Tables 4 and 5.

As the processing time for mercerization increases, the action of alkali gradually increases so that decomposition caused by severance between molecules starts from parts which are the most vulnerable to alkali, the production of low molecular weight species. In the case of a hardwood, for example, of the chemical components which constitute a wood raw material, a glucuronoxylan-lignin linkage in the lignin-carbohydrate complex (LCC) is the most vulnerable to alkali. A glucuronoxylan is a polysaccharide component constituting the base of a lignin-carbohydrate complex (LCC). It is known that glucuronoxylan-lignin linkages are benzyl-ester linkages and benzyl-ether linkages [T. Koshijima, T. Watanabe and J. Azuma, Existence of Benzylated Carbohydrate Moiety in Lignin-Carbohydrate Complex from Pine Wood, Chemistry Letters, 1737–1740, (1984); T. Watanabe, S. Kaizu and T. Koshijima, Binding Sites of Carbohydrate Moieties toward Lignin in "Lignin-Carbohydrate Complex" from *Pinus densiflora* Wood, Chemistry Letters, 1871–1874, (1986); N. Takahashi and T. Koshijima, Ester Linkages between Lignin and Glucuronoxylan in a Lignin-Carbohydrate Complex from Beech (*Fagus crenata*) Wood, Wood Sci. Technol. 22:231–241, (1988); T. Watanabe and T. Koshijima, Evidence for Ester Linkages between Lignin and Glucuronic Acid in Lignin-Carbohydrate Complex by DDQ-Oxidation, Agric. Biol. Chem., 52(11), 2953–2955, (1988); T. Koshijima, T. Watanabe and F. Yaku, Structure and Properties of the Lignin-Carbohydrate Complex Polymer as an Amphipathic Substance, ACS Symposium Series No.397, "Lignin: Properties and Materials", 11–28, (1989); T. Watanabe, T. Imamura, T. Koshijima and M. Kuwahara, Determination of Ester Bonds between Lignin and Glucuronoxylan in *Fagus crenata* Wood, Seventh International Symposium on Wood and Pulping Chemistry (Proceedings) 1, 82–86, (1993)]. After lignin has been accordingly separated from a lignin-carbohydrate complex (LCC) by the action of alkali, the lignin-carbohydrate complex (LCC) is decomposed into two components, that is, glucuronoxylan and lignin so that the lignin-carbohydrate complex (LCC) loses the property of functioning as a compatibilizer. Of the lignin-carbohydrate complex (LCC) contained in an ordinary hardwood, 90 wt % or more exists as lignin-glucuronoxylan complex. 60 to 70 wt % of lignin-carbohydrate complex (LCC) contained in a softwood such as Japanese *Pinus densiflora* or Canadian spruce exists as lignin-glucomannan complex and 30 to 40 wt % as lignin-glucuronoxylan complex.

Considerable amounts of lignin in wood raw materials are thought to be associated with carbohydrate and to exist in the form of a lignin-carbohydrate complex (LCC). Therefore, a part of lignin-carbohydrate complex (LCC) loses carbohydrate through mercerization, and the resulting lignin as a simple substance has no compatibility to cellulose and hemicellulose which are the main components of wood raw materials. This causes the low plasticity of benzylated lignin to appear prominently in the nature of a benzylated lignocellulosic substance, so that the thermal plastic state of the benzylated lignocellulosic substance deteriorates, increasing its melting viscosity (see Table 4). In this respect, a hot press molded film formed by benzylating only lignin is so brittle that molding of such a film itself is very difficult. The reason for this is that lignin is not a linear polymer but a random polymer in which phenyl propane units which are structural units of lignin are bonded at random.

The reason why the softening point rises as processing time for mercerization increases as shown in Table 5 is that lignin-carbohydrate complex (LCC) is severed and decomposed into two components, i.e., glucuronoxylan and lignin, resulting in a decrease in compatibility and that a part of lignin-carbohydrate complex (LCC) elutes by itself. This is apparent from FIG. 3 which demonstrates that lignin-carbohydrate complex (LCC) content (wt %) decreases as the processing time for mercerization increases. Table 6 and the graph of FIG. 2 demonstrate the variation in the extraction rate (wt %) by heating with dioxane, the extraction rate varying in accordance with processing time for mercerization (alkali treatment) which is carried out in the course of the production of a benzylated lignocellulosic substance.

TABLE 6

| Processing time for mercerization (min.) | Extraction rate by heating with dioxane (wt %) |
| --- | --- |
| 15 | 9.64 |
| 17 | 7.80 |
| 20 | 6.50 |
| 25 | 5.26 |
| 30 | 8.20 |
| 40 | 11.71 |
| 50 | 5.81 |

Figure 2:
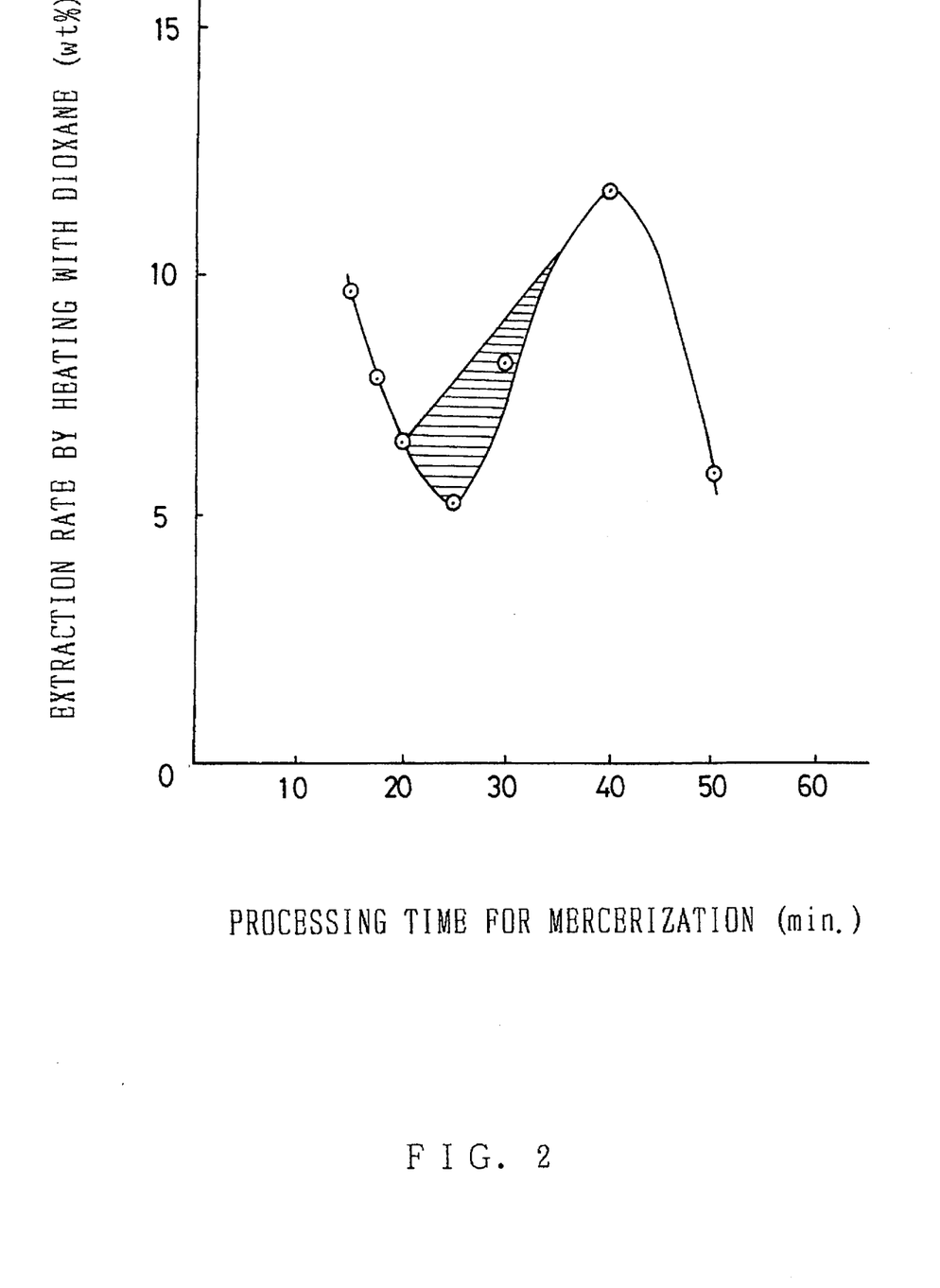
FIG. 2 is a graph showing the relationship between processing time for mercerization of hardwood flour in the production of a benzylated lignocellulosic substance and extraction rate from the benzylated lignocellulosic substance by heating with dioxane (wt %)

The extracts mentioned herein are benzylated relatively low-molecular weight hemicellulose, and lignin-carbohydrate complex (LCC). The hatched region enclosed by a straight line and curve in FIG. 2 represents the region where benzylated lignocellulosic substances exhibit relatively high foamability. For example, when hardwoods are used as the wood raw material of a benzylated lignocellulosic substance, the extraction rate (wt %) by dioxane multiplied by 0.49 is approximately equal to the absolute amount (wt %) of lignin-carbohydrate complex (LCC) contained in the lignocellulosic substance after benzylation. No matter whether hardwoods or softwoods are used as the wood raw material, the absolute amount of lignin-carbohydrate complex (LCC) contained in the benzylated lignocellulosic substances having high foamability is in the range of 2.83 to 4.01 wt %, and the absolute amount is approximately 1.5 wt % in the case of substances having moderate formability. In the case of benzylated lignocellulosic substances made from hardwoods, when the absolute amount is within the range of 2.83 to 4.01 wt %, the lignin-carbohydrate complex (LCC) remaining rate ranges from 73 to 96%, and when the absolute amount is 1.5 wt %, the remaining rate is 46%. Further, when the absolute amount is 3.3 wt %, the remaining rate is a bit less than 97%. When softwoods and groundwood pulps are used as the wood raw material, as is the case when using hardwoods as the wood raw material, the benzylated lignocellulosic substance exhibits a low expansion ratio within the range of 2:1 to 4:1, if the absolute amount of lignin-carbohydrate complex (LCC) is less than 1.2 wt %.

The degree of substitution by benzyl groups (the number of OH groups substituted by benzyl groups per glucose residue) is about 1.3 to 1.5 in the case of hardwoods, but it should be in the range of about 1.4 to 1.5 in order to achieve high foamability. The substitution degree in the case of softwoods is about 1.6 to 1.8. However, foamability mainly depends on the amount (wt %) of lignin-carbohydrate complex (LCC) contained in a benzylated lignocellulosic substance and there is little relationship between the degree of substitution by benzyl groups taken by itself and foamability.

The benzylated lignocellulosic substances according to the invention are tough, easy to be molded, and can be foamed without using a plasticizer or any other additives. Further, they possess physical properties strong enough to withstand practical use and can be biodegraded by microorganisms in soil. Therefore, they can be used in a wide variety of applications: for example, they can be used as a material for foamed molded articles such as plates, cups, trays for food and drink, various types of wrappings, cushioning and thermal insulating materials for precision instruments and electric appliances etc.; as a material for low-foamed molded articles such as cushioning materials for parts used in living space (e.g., car interior parts); and as a material for injection-molded foam boards such as low temperature containers for farm products. Since the surfaces of the benzylated lignocellulosic substances of the invention cannot by easily given a positive or negative electrical charge, they are particularly useful for producing materials, containers and packings which have to avoid the occurrence of static electricity.

Test sheets similar to those used in the above-described measurement of Young's modulus were prepared, using foamed or non-foamed benzylated lignocellulosic substances according to the invention, whose lignin-carbohydrate complex (LCC) remaining rates ranges from 73 to 96%. A tensile strength test, a constant rising temperature test and a melting viscosity (melt viscosity) test were conducted on the test sheets in the same way as described above. The data of physical properties obtained from these tests are shown below..pa Non-foamed Test Sheets:

| | |
| --- | --- |
| tensile strength (kgf/mm$^2$) | 3.76 to 4.60 |
| ultimate tensile strain (%) | 0.88 to 2.52 |
| Young's modulus (×10$^4$ kgf/cm$^2$) | 1.50 to 1.70 |
| softening point (°C.) | 90 to 110 |
| flow point (°C.) | 140 to 170 |
| melt viscosity (poise) | 5,300 to 29,170 |
| Foamed test sheets: | |
| expansion ratio | 11:1 to 21:1 |
| closed cell ratio (%) | 35 to 100 |

According to the invention, there is provided a method of producing a benzylated lignocellulosic substance obtained through benzylation, in which 46 to less than 97% of lignin-carbohydrate complex (LCC) contained in a wood raw material remains, comprising the steps of:

(a) mercerizing the wood raw material, such as wood flour or pulp containing lignin such that the lignin, -carbohydrate complex (LCC) contained in the wood raw material are not excessively decomposed; and (b) benzylating the wood raw material, such as wood flour or pulp containing lignin, which has undergone the mercerizing step.

According to the above-described method of producing a benzylated lignocellulosic substance, mercerization and benzylation may be carried out within the same vessel or different vessels. In the case the same vessel, after mercerization has been conducted with a mercerization agent, benzylation may be carried out by adding a benzylation agent. Alternatively, a mercerization agent and a benzylation agent are firstly added at the same time and the conditions for reaction are controlled so that benzylation takes place subsequently to the occurrence of mercerization. Preferably, a microwave is energy added to the system of reaction in the course of benzylation, so as to increase the rate of benzylation.

The lignin-carbohydrate complex (LCC) remaining rate within the range of 46 to less than 97% corresponds to 1.5 wt % or more as the absolute amount of lignin-carbohydrate complex (LCC) contained in the benzylated lignocellulosic substance. In the invention, potassium hydroxide, sodium hydroxide or lithium hydroxide may be employed as the alkali used in mercerization, but sodium hydroxide is the most preferable. Mercerization was carried out with sodium hydroxide concentrations of 30%, 35%, 40% and 48%. Reaction temperatures for mercerization were 13° C., 15° C., 18° C., 20° C., 23° C., 30° C. and 40° C. The best foamability was achieved when the sodium hydroxide concentration is 40% and the mercerization temperature is 18° C. to 23° C. Benzylation was carried out with benzyl chloride at reaction temperatures of 90° C., 110° C. and 150° C. The best foamability was achieved when the reaction temperature was 110° C. In order to achieve a benzylated lignocellulosic substance having suitable physical properties such as tensile strength and Young's modulus, the sodium hydroxide concentration of the reaction mixture is preferably 0.0144 mol/ml or more and the benzyl chloride concentration of the reaction mixture is preferably 0.00576 mol/ml or more.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIGS. 1 to 3 are directed to explanation of preferred embodiments of a benzylated lignocellulosic substance and of producing same method thereof, according to the invention; and in particular

PREFERRED EMBODIMENTS OF THE INVENTION

Preferred embodiments of a benzylated lignocellulosic substance and a production method according to the invention will be hereinafter described. Note that the wood flour of Japanese hardwood admixture and the wood flour of Japanese *Pinus densiflora* wood used as wood raw material in the following examples have a lignin content of 20.2 wt % and 28.0 wt %, respectively.

EXAMPLE 1

16.6 parts (1,424 grams) of a 40% sodium hydroxide aqueous solution were added to one part (60 grams) of an admixture of Japanese hardwood flours (100 mesh) and the product was mercerized by stirring for 20 minutes at 23° C. Then, the mercerized wood flours were immediately precipitated by centrifuging, thereby removing excessive alkali and then put in a 1-liter vessel made of pressure resistant glass. 5.4 parts (356 grams) of benzyl chloride were added to one part of the wood flours from which excessive alkali had been removed, and the mixture was allowed to react in the tightly closed vessel at 110° C. for 5 hours. After the completion of the reaction, the resinous product was taken out of the vessel, washed with methanol and water in this order until it was neutralized and then dried, thereby obtaining a benzylated lignocellulosic substance. Drying of the resinous product was performed at a constant temperature of 65° C. for 48 hours by means of a constant temperature forced air drier produced by Tokyo Rikakikai K. K.

The lignin-carbohydrate complex (LCC) remaining rate of the benzylated lignocellulosic substance thus obtained was 95.9% and the degree of substitution was 1.4. A tensile strength test was conducted in the same way as described earlier and it was found that the tensile strength was 4.40 kgf/mm$^2$, ultimate tensile strain 1.30%, and Young's modulus $1.57 \times 10^4$ kgf/cm$^2$. A constant rising temperature test and a melting viscosity test were conducted in the same way as described earlier and it was found that the softening point was 105° C., flow point 148° C. and the melt viscosity was 5,300 poise. It was found from measurements made in the same way as described earlier that the extraction rate by heating with dioxane was 6.50 wt % and the yield 160%. The absolute amount of lignin-carbohydrate complex (LCC) contained in the benzylated substance was 3.24 wt %. When this benzylated lignocellulosic substance was foamed by injection molding, the maximum expansion ratio was 15:1.

The benzylated lignocellulosic substance was molded by hot press molding at 200 kgf/cm$^2$ and 155° C. and as a result, a tough brown film having good transparency was obtained.

EXAMPLE 2

16.6 parts (118.7 kilo grams) of a 40% sodium hydroxide aqueous solution were added to one part (5 kilo grams) of an admixture of Japanese hardwood flours (100 mesh) and the product was mercerized by stirring for 30 minutes at 23° C. Like Example 1, the mercerized wood flours were immediately precipitated by centrifuging, thereby removing excessive alkali and then put in a vessel similar to that of Example 1. Then, 5.4 parts (29.7 kilo grams) of benzyl chloride were added to one part of the wood flours from which excessive alkali had been removed and the mixture was allowed to react under the same conditions as those of Example 1. After the completion of the reaction, the resinous product was taken out of the vessel, washed with methanol and water in this order until it became neutral and then dried under the same conditions as those of Example 1, thereby obtaining a benzylated lignocellulosic substance.

The lignin-carbohydrate complex (LCC) remaining rate of the benzylated lignocellulosic substance thus obtained was 89.4% and the degree of substitution was 1.4. A tensile strength test was conducted in the same way as described earlier and it was found that the tensile strength was 4.43 kgf/mm$^2$, ultimate tensile strain 1.80%, and Young's modulus $1.63 \times 10^4$ kgf/cm$^2$. It was found from a constant rising temperature test and melting viscosity test conducted in the same way as described earlier that the softening point was 110° % flow point 150° C., melt viscosity 29,170 poise and yield 160.2%. The absolute amount of lignin-carbohydrate complex (LCC) contained in the benzylated substance was 4.01 wt %.

When this benzylated lignocellulosic substance was foamed without adding a plasticizer or any other additives, a pale yellow foamed product with a maximum expansion ratio of 20:1 and a closed cell ratio of 100% was obtained.

When this benzylated lignocellulosic substance was molded by hot press molding for obtaining a hot press molded film like in Example 1, a tough hot press molded film was obtained.

EXAMPLE 3

16.6 parts (118.7 kilo grams) of a 40% sodium hydroxide aqueous solution were added to one part (5 kilo grams) of bleached sulfite pulp produced from an admixture of Japanese hardwoods, and the product was mercerized by stirring for 30 minutes at 23° C. Like Example 2, the mercerized pulp was immediately precipitated by centrifuging, thereby removing excessive alkali. Then, 5.4 parts (29.7 kilo grams) of benzyl chloride were added to one part of the pulp, thereby benzylating the pulp in the tightly closed vessel under the same conditions as those of Example 2. Like Example 2, the benzylated pulp was washed and dried, thereby obtaining a benzylated lignocellulosic substance. The degree of substitution was 1.6. It was found from a tensile strength test conducted in the same way as described earlier that the tensile strength of the benzylated lignocellulosic substance was 4.25 kgf/mm$^2$, ultimate tensile strain 12.2% and Young's modulus $1.03 \times 10^4$ kgf/cm$^2$. It was also found from a constant rising temperature test and melting viscosity test conducted in the same way as described above that the softening point was 115° C., flow point 153° C. and melt viscosity 6,079 poise.

The yield of the benzylated lignocellulosic substance was 186%. When this benzylated lignocellulosic substance was foamed without adding a plasticizer or any other additives, a foamed product with a maximum expansion ratio of 18:1 and a closed cell ratio of 9 to 27% was obtained.

EXAMPLE 4

16.6 parts (1,187 grams) of a 40% sodium hydroxide aqueous solution were added to one part (50 grams) of an admixture of Japanese hardwood flours (100 mesh) and the product was mercerized for 25 minutes at 23° C. After the mercerized woods flour had been precipitated by centrifuging, thereby removing excessive alkali liquid, 5.4 parts (297 grams) of benzyl chloride were added to one part of the wood flours and the mixture was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 93.7%, the degree of substitution 1.4 and Young's modulus $1.66 \times 10^4$ kgf/cm$^2$. It was found from a constant rising temperature test and melt viscosity test conducted in the same way as described above that the softening point was 105° C. and the flow point was 140.4° C. The yield was 161%, the absolute amount of lignin-carbohydrate complex (LCC) contained in the benzylated substance was 2.58 wt %, and maximum expansion ratio 16.4:1.

The degree of substitution was obtained in the following procedures: the benzylated lignocellulosic substance was acetylated until it has no free hydroxyl group; the proton nuclear magnetic resonance (NMR) of the chloroform deuteride solution was measured; the degree of substitution was calculated from the quantity of aromatic nuclear proton and that of acetyl proton. Note that the components insoluble in chloroform were derived from lignin.

EXAMPLE 5

16.6 parts (1,424 grams) of a 40% sodium hydroxide aqueous solution were added to one part (60 grams) of an admixture of Japanese hardwood flours (100 mesh) and the product was mercerized for 50 minutes at 23° C. After the mercerized wood flours had been precipitated by centrifuging, thereby removing excessive alkali liquid, 5.4 parts (356 grams) of benzyl chloride were added to one part of the wood flours and the mixture was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 73.0% and the degree of substitution was 1.5. A tensile strength test was conducted in the same way as described earlier and it was found that the tensile strength was 4.40 kgf/mm$^2$, ultimate tensile strain 1.63% and Young's modulus $1.50 \times 10^4$ kgf/cm$^2$. It was found from a constant rising temperature test and melt viscosity test conducted in the same way as described earlier that the softening point was 105° C., and flow point 144.4° C. The yield was 139%, the absolute amount of lignin-carbohydrate complex (LCC) contained in the benzylated substance 2.83 wt % and maximum expansion ratio 19.0:1.

EXAMPLE 6

16.6 parts (1,424 grams) of a 40% sodium hydroxide aqueous solution were added to one part (60 grams) of an admixture of Japanese hardwood flours (100 mesh) and the product was mercerized for 60 minutes at 23° C. After the mercerized wood flours had been precipitated by centrifuging, thereby removing excessive alkali liquid, 5.4 parts (356 grams) of benzyl chloride were added to one part of the wood flours and the mixture was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 46.3% and the degree of substitution was 1.45. A tensile strength test was conducted in the same way as described earlier and it was found that the tensile strength was 4.40 kgf/mm$^2$, ultimate tensile strain 2.47% and Young's modulus $1.37 \times 10^4$ kgf/cm$^2$. It was found from a constant rising temperature test and melt viscosity test conducted in the same way as described earlier that the softening point was 108° C., and flow point 148.1° C. The yield was 164%, the absolute amount of lignin-carbohydrate complex (LCC)

contained in the benzylated substance 1.52 wt % and maximum expansion ratio 8:1.

EXAMPLE 7

16.6 parts (1,187 grams) of a 40% sodium hydroxide aqueous solution were added to one part (50 grams) of an admixture of Japanese hardwood flours (100 mesh) and the product was mercerized for 17 minutes at 23° C. After the mercerized wood flours had been precipitated by centrifuging, thereby removing excessive alkali liquid, 5.4 parts (297 grams) of benzyl chloride were added to one part of the wood flours and the mixture was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 97.4% and the degree of substitution was 1.3. A tensile strength test was conducted in the same way as described earlier and it was found that the tensile strength was 3.70 kgf/mm$^2$, ultimate tensile strain 1.80% and Young's modulus 1.30×10$^4$ kgf/cm$^2$. It was found from a constant rising temperature test and melt viscosity test conducted in the same way as described earlier that the softening point was 100° C., and flow point 145.5° C. The yield was 160%, the absolute amount of lignin-carbohydrate complex (LCC) contained in the benzylated substance 3.29 wt % and maximum expansion ratio 7.8:1. As the processing time for mercerization of this example is short (17 minutes), the degree of substitution is low as compared with the degree of substitution of Example 4. As a result, the benzylated lignocellulosic substance obtained in this example was somewhat brittle and had a lower expansion ratio.

EXAMPLE 8

16.6 parts (1,187 grams) of a 40% sodium hydroxide aqueous solution were added to one part (50 grams) of unbleached sulfite pulp (lignin content=4.5 wt %) produced from an admixture of Japanese hardwood chips and the product was mercerized for 15 minutes at 20° C. After the mercerized product had been precipitated by centrifuging, thereby removing excessive alkali liquid, 5.4 parts (297 grams) of benzyl chloride were added to the precipitate. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 34.9% and the degree of substitution was 1.45. A tensile strength test was conducted in the same way as described earlier and it was found that the tensile strength was 4.00 kgf/mm$^2$, ultimate tensile strain 2.53% and Young's modulus 1.53×10$^4$ kgf/cm$^2$. It was found from a constant rising temperature test and melt viscosity test conducted in the same way as described earlier that the softening point was 100.5° C., and flow point 132.1° C. The yield was 180%, the absolute amount of lignin-carbohydrate complex (LCC) contained in the benzylated substance 0.21 wt % and maximum expansion ratio 11.9:1. This is an example of wood raw materials containing small amounts of lignin.

EXAMPLE 9

16.6 parts (1,187 grams) of a 40% sodium hydroxide aqueous solution were added to one part (50 grams) of Japanese *Pinus densiflora* wood flour (100 mesh) and the product was mercerized for 25 minutes at 23° C. After the mercerized product had been precipitated by centrifuging, thereby removing excessive alkali liquid, 5.4 parts (297 grams) of benzyl chloride were added to one part of the precipitate. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 96.0% and the degree of substitution was 1.8. A tensile strength test was conducted in the same way as described earlier and it was found that the tensile strength was 4.22 kgf/mm$^2$, ultimate tensile strain 0.82% and Young's modulus 1.73×10$^4$ kgf/cm$^2$. It was found from a constant rising temperature test and melt viscosity test conducted in the same way as described earlier that the softening point was 95.2° C., and flow point 138.0° C. The yield was 172%, the absolute amount of lignin-carbohydrate complex (LCC) contained in the benzylated substance 1.11 wt % and maximum expansion ratio 3.6:1.

EXAMPLE 10

16.6 parts (1,187 grams) of a 40% sodium hydroxide aqueous solution were added to one part (50 grams) of Japanese *Pinus densiflora* wood flour (100 mesh) and the product was mercerized for 30 minutes at 23° C. After the mercerized product had been precipitated by centrifuging, thereby removing excessive alkali liquid, 5.4 parts (297 grams) of benzyl chloride were added to one part of the precipitate. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 95.5% and the degree of substitution was 1.6. A tensile strength test was conducted in the same way as described earlier and it was found that the tensile strength was 2.87 kgf/mm$^2$, ultimate tensile strain 0.48% and Young's modulus 1.87×10$^4$ kgf/cm$^2$. It was found from a constant rising temperature test and melt viscosity test conducted in the same way as described earlier that the softening point was 94.6° C., and flow point 138.6° C. The yield was 161%, the absolute amount of lignin-carbohydrate complex (LCC) contained in the benzylated substance 1.17 wt % and maximum expansion ratio 3.2:1.

EXAMPLE 11

16.6 parts (1,187 grams) of a 40% sodium hydroxide aqueous solution were added to one part (50 grams) of Japanese *Pinus densiflora* wood flour (100 mesh) and the product was mercerized for 60 minutes at 23° C. After the mercerized product had been precipitated by centrifuging, thereby removing excessive alkali liquid, 5.4 parts (297 grams) of benzyl chloride were added to one part of the precipitate. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 88.4% and the degree of substitution was 1.6. A tensile strength test was conducted in the same way as described earlier and it was found that the tensile strength was 4.17 kgf/mm$^2$, ultimate tensile strain 0.67% and Young's modulus 1.67×10$^4$ kgf/cm$^2$. It was found from a constant rising temperature test and melt viscosity test conducted in the same way as described earlier that the softening point was 97.3° C., and flow point 151.4° C. The yield was 160%, the absolute amount of lignin-carbohydrate complex (LCC) contained in the benzylated substance 1.09 wt % and maximum expansion ratio 3.6:1.

EXAMPLE 12

16.6 parts (1,187 grams) of a 40% sodium hydroxide aqueous solution were added to one part (50 grams) of a groundwood pulp (lignin content=22.5 wt %) made from spruce which is a kind of Canadian softwood and the product was mercerized for 40 minutes at 23° C. After the mercerized product had been precipitated by centrifuging, thereby removing excessive alkali liquid, 5.4 parts (297 grams) of benzyl chloride were added to one part of the precipitate. Then, the product was allowed to react for 5 hours at 110° C., thereby obtaining a benzylated lignocellulosic substance under the same conditions as those of Example 2. The degree of substitution was 1.65. A tensile strength test was conducted in the same way as described earlier and it was found that the tensile strength was 3.90 kgf/mm$^2$, ultimate tensile strain 1.33% and Young's modulus 1.64×10$^4$ kgf/cm$^2$. It was found from a constant rising temperature test and melt viscosity test conducted in the same way as described earlier that the softening point was 90.2° C., and flow point 134.5° C. The yield was 172%, the absolute amount of lignin-carbohydrate complex (LCC) contained in the benzylated substance 0.77 wt % and maximum expansion ratio 4.0:1.

EXAMPLE 13

2.1 parts (180 grams) of a 40% sodium hydroxide aqueous solution were added to one part (60 grams) of an admixture of Japanese hardwood flours (100 mesh) and the product was mercerized for 40 minutes at 20° C. After the mercerization, 5.4 parts (356 grams) of benzyl chloride were immediately added to one part of the product without removing alkali liquid. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 91.3% and the degree of substitution was 1.4. A tensile strength test was conducted in the same way as described earlier and it was found that the tensile strength was 4.50 kgf/mm$^2$, ultimate tensile strain 1.28% and Young's modulus 1.63×10$^4$ kgf/cm$^2$. It was found from a constant rising temperature test and melt viscosity test conducted in the same way as described earlier that the softening point was 97° C., and flow point 146.8° C. The yield was 161%, the absolute amount of lignin-carbohydrate complex (LCC) contained in the benzylated substance 3.06 wt % and maximum expansion ratio 16.0:1. In this example, since the amount of sodium hydroxide aqueous solution used was small (2.1 parts), benzylation was carried out without removal of sodium hydroxide.

EXAMPLE 14

2.1 parts (180 grams) of a 40% sodium hydroxide aqueous solution were added to one part (60 grams) of an admixture of Japanese hardwood flours (100 mesh) and the product was mercerized for 80 minutes at 25° C. After the mercerization, 5.4 parts (356 grams) of benzyl chloride were immediately added to one part of the product without removing alkali liquid. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 72.2% and the degree of substitution was 1.37. A tensile strength test was conducted in the same way as described earlier and it was found that the tensile strength was 4.45 kgf/mm$^2$, ultimate tensile strain 1.70% and Young's modulus 1.53×10$^4$ kgf/cm$^2$. It was found from a constant rising temperature test and melt viscosity test conducted in the same way as described earlier that the softening point was 97.0° C., and flow point 147.3° C. The yield was 160%, the absolute amount of lignin-carbohydrate complex (LCC) contained in the benzylated substance 2.44 wt % and maximum expansion ratio 11.8:1.

EXAMPLE 15

60 grams of an admixture of Japanese hardwood flours (100 mesh) were allowed to swell for 10 minutes with 196 grams of benzyl chloride. After one part of the product had been mixed with 2.1 parts (180 grams) of a 40% sodium hydroxide aqueous solution in a reactor, the temperature of the mixture was immediately raised to 110° C. without removing alkali liquid. Then, the product was allowed to react at the same temperature for 7.2 hours, thereby obtaining an elastic product. The softening point of the elastic product thus obtained was 104° C., flow point 151.6° C., yield of the elastic product thus obtained 158% and maximum expansion ratio 2.0:1.

EXAMPLE 16

16.6 parts (1,187 grams) of a 40% sodium hydroxide aqueous solution were added to one part (50 grams) of Japanese *Pinus densiflora* wood flour (100 mesh) and the product was mercerized for 90 minutes at 23° C. After the mercerized product had been precipitated by centrifuging, thereby removing excessive alkali liquid, 5.4 parts (297 grams) of benzyl chloride were added to one part of the precipitate. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 73.0% and the degree of substitution was 1.6. A tensile strength test was conducted in the same way as described earlier and it was found that the tensile strength was 3.92 kgf/mm$^2$, ultimate tensile strain 1.35% and Young's modulus 1.63×10$^4$ kgf/cm$^2$. It was found from a constant rising temperature test and melt viscosity test conducted in the same way as described earlier that the softening point was 97.8° C., and flow point 150.5° C. The yield was 160%, the absolute amount of lignin-carbohydrate complex (LCC) contained in the benzylated substance 0.90 wt % and maximum expansion ratio 3.0:1.

EXAMPLE 17

16.6 parts (1,187 grams) of a 40% sodium hydroxide aqueous solution were added to one part (50 grams) of Japanese *Pinus densiflora* wood flour (100 mesh) and the product was mercerized for 115 minutes at 23° C. After the mercerized product had been precipitated by centrifuging, thereby removing excessive alkali liquid, 5.4 parts (297 grams) of benzyl chloride were added to one part of the precipitate. Then, the product was allowed to react for 5 hours at 110° C., thereby obtaining a benzylated lignocellulosic substance under the same conditions as those of Example 2. The lignin-carbohydrate complex (LCC) remaining rate of the benzylated lignocellulosic substance thus obtained was 43.0% and the degree of substitution was 1.6. A tensile strength test was conducted in the same way as described earlier and it was found that the tensile strength was 3.68 kgf/mm², ultimate tensile strain 1.18% and Young's modulus 1.62×10⁴ kgf/cm². It was found from a constant rising temperature test and melt viscosity test conducted in the same way as described earlier that the softening point was 98.5° C., and flow point 151.5° C. The yield was 161%, the absolute amount of lignin-carbohydrate complex (LCC) contained in the benzylated substance 0.53 wt % and maximum expansion ratio 2.0:1.

Test Example

In order to prove the effect of lignin-carbohydrate complex (LCC) content on the foamability of a benzylated substance, the following test was conducted. In this test, benzylated substances made from wood materials having high lignin contents and ones made from wood materials having low lignin contents were used as samples.

1. For the measurement of the lignin-carbohydrate complex (LCC) contents of Japanese *Pinus densiflora* wood flour and the same material after mercerization, a reference lignin-carbohydrate complex (LCC) was prepared in the same procedures as described in the case of Table 1. Aqueous solutions of the reference lignin-carbohydrate complex (LCC) having different lignin-carbohydrate (LCC) concentrations were prepared and the absorbency of each solution was measured. The results are shown in Table 7.

TABLE 7

| No. | Concentration (g/l) | Absorbency |
|---|---|---|
| 1 | 0.0235 | 0.125 |
| 2 | 0.0470 | 0.251 |
| 3 | 0.0588 | 0.314 |
| 4 | 0.0706 | 0.375 |
| 5 | 0.0941 | 0.504 |
| 6 | 0.1176 | 0.632 |

2. The absorbencies of extracts from Japanese *Pinus densiflora* wood flour and samples obtained by mercerizing Japanese *Pinus densiflora* wood flour over specified periods of time were measured in the same method as mentioned earlier. With the measured absorbencies, the lignin-carbohydrate complex (LCC) concentration of each sample was obtained from the working curve representing Table 7, and the lignin-carbohydrate complex (LCC) content (wt %) of each sample was determined. For each sample, the lignin-carbohydrate complex (LCC) remaining rate (%) was calculated from the lignin-carbohydrate complex (LCC) content (wt %) and the maximum expansion ratio was measured. The results are shown in Table 8.

TABLE 8

| | Lignin-carbohydrate complex (LCC) content wt % | Lignin-carbohydrate complex (LCC) remaining rate % | Maximum expansion ratio of benzylated wood flour |
|---|---|---|---|
| Wood raw flour of Japanese *Pinus densiflora* wood | 1.98 | 100 | — |
| Mercerized wood flour (15 min.)* | 1.90 | 96.0 | 3.0 |
| Mercerized wood flour (25 min.) | 2.00 | 101 | 3.6 |
| Mercerized wood flour (30 min.) | 1.89 | 95.5 | 3.2 |
| Mercerized wood flour (40 min.) | 2.00 | 101 | 3.2 |
| Mercerized wood flour (60 min.) | 1.75 | 88.4 | 3.6 |
| Mercerized wood flour (90 min.) | 1.45 | 73.0 | 3.0 |
| Mercerized wood flour (115 min.) | 0.85 | 43.0 | 2.0 |

*processing time

From Table 8 which shows the measurement results of samples prepared from Japanese *Pinus densiflora* (softwood), as well as from the foregoing examples, the following facts will be understood.

When using a wood raw material containing a large amount of lignin, not only the lignin-carbohydrate complex (LCC) remaining rate but also the remaining amount of lignin-carbohydrate complex (LCC) which act as a compatibilizer in the lignocellulosic substance to be obtained is very important. For example, when using a wood raw material (e.g., hardwoods, softwoods and pulps made from them) whose lignin content is 20 wt % or more, even if the lignin-carbohydrate complex (LCC) remaining rate is 73% or more, satisfactory foaming (the preferable maximum expansion ratio is 8:1 or more) cannot be achieved in foaming without adding a plasticizer or any other additives unless the lignin-carbohydrate complex (LCC) content shown in FIG. 3 is 2.5 wt % or more or unless the absolute amount of lignin-carbohydrate complex (LCC) after benzylation is 1.5 wt % or more (Examples 9 to 11 and Table 8). In the case of the softwood in Table 8, the lignin-carbohydrate complex (LCC) content is 2 wt % or less, that is, the absolute amount of lignin-carbohydrate complex (LCC) contained in the benzylated substance is 1.2 wt % or less. Therefore, the benzylated substance does not contain a sufficient absolute amount of lignin-carbohydrate complex (LCC) to function as a compatibilizer between lignin and benzylated cellulose even if satisfactory benzylation has been carried out. As a result, the foamability of the benzylated substance cannot be improved even when the lignin-carbohydrate complex (LCC) remaining rate is 100% (101% is an experimental error).

On the other hand, when using a wood raw material containing a small amount of lignin, even if the lignin-carbohydrate complex (LCC) content shown in FIG. 3 is 2.5 wt % or less, or even if the absolute amount of lignin-carbohydrate complex (LCC) contained in the benzylated substance is 1.5 wt % or less, the foamability of benzylated cellulose is assured because foaming is not disturbed by lignin so much, so that foamed products can be produced from the benzylated lignocellulosic substance (Examples 3 and 8).

For foaming the benzylated lignocellulosic substances, a twin-screw extruder ("Laboplastomill 2D25-S" produced by Toyo Seiki Seisakusho) was employed. As a foaming agent, 5 to 7 PHR of methyl chloride/butane mixture for industrial use was forced by pressure into the extruder. Then, the material was heated to 117° to 119° C. and extruded (extrusion process). The specific gravity (b) of each foamed sample was measured and the ratio of the specific gravity (a) of the sample before foaming to that (b) of the sample after foaming (a/b) was defined as expansion ratio. A conventional method may be used for foaming the benzylated lignocellulosic substances. In one method, a benzylated lignocellulosic substance is placed in a wire gauze and heated to 100° C. in the presence of 2,2-dichloro-1,1,1-trifluoroethane in an autoclave to allow flon impregnated. One hour later, the autoclave is evacuated (depressurization process).

While the invention has been particularly described with hardwood admixtures composed of a plurality of kinds of hardwoods in the foregoing examples, it is readily apparent that hardwood materials composed of one kind of hardwood may be used. Also, instead of one kind of softwood such as Japanese *Pinus densiflora* wood and spruce, softwood admixtures composed of a plurality of kinds of softwoods may be used. It is also possible to use one kind or a plurality of kinds of hardwoods and one kind or a plurality of kinds of softwoods in combination. Further, a pulp may be added to such admixtures.

In the case of a benzylated lignocellulosic substance made from hardwood, the absolute amount of lignin-carbohydrate complex (LCC) is 5 to 6 wt %, and in the case of softwood, the absolute amount is 1.8 to 2 wt %. In the case of a substance made from chemical pulp, the absolute amount varies depending on the lignin content of the chemical pulp used and the absolute amount of lignin-carbohydrate complex (LCC) is significant only when the lignin content is 10 wt % or more, because lignin-carbohydrate complex (LCC) functions as a compatibilizer between lignin and cellulose. If the lignin content is small, the foamability of the benzylated substance is considerably affected by cellulose, resulting in a decreased closed cell ratio and therefore the significant deterioration of strength.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A benzylated material obtained from a wood raw material having an original amount of lignin-carbohydrate complex (LCC), said benzylated lignocellulose material containing a remaining rate of 46 to less than 97% of said original amount of the lignin-carbohydrate complex (LCC), said benzylated lignocellulose having an absolute amount of at least 1.5% by weight of the lignin-carbohydrate complex (LCC) and having a degree of benzyl substitution per glucose residue of about 1.3 to 1.5 for hardwoods and about 1.6 to 1.8 for softwoods.

2. A benzylated lignocellulose material according to claim 1, wherein the wood raw material is wood flour.

3. The benzylated lignocellulosic substance as set forth in claim 1, wherein the lignin-carbohydrate complex (LCC) remaining rate is within the range from 73 to 96%.

4. The benzylated lignocellulosic substance as set forth in claim 3, containing 2.83 wt % or more as the absolute amount of lignin-carbohydrate complex (LCC).

5. A benzylated lignocellulosic substance according to claim 1, having the physical properties of: a tensile strength of 3.76 to 4.60 kgf/mm$^2$; ultimate tensile strain of 0.88 to 2.52%; Young's modulus of $1.50 \times 10^4$ kgf/cm$^2$ to $1.70 \times 10^4$ kgf/cm$^2$; softening point of 90° to 110 ° C.; flow point of 140° to 170° C.; and melt viscosity of 5,300 to 29,170 poise.

6. The benzylated lignocellulosic substance as set forth in claim 1, wherein the wood raw material comprises at least one kind of hardwood.

7. The benzylated lignocellulosic substance as set forth in claim 1, wherein the wood raw material comprising at least one kind of softwood.

8. A benzylated lignocellulosic substance according to claim 5 which is hardwood substituted by 1.3 to 1.5 benzyl groups per glucose residue.

9. A substance according to claim 8, wherein the hardwood is substituted by 1.4 to 1.5 benzyl groups.

10. A benzylated lignocellulosic substance according to claim 1 containing 2.83 to 4.01 wt. % of lignin-carbohydrate complex (LCC).

* * * * *